United States Patent Office 2,730,115
Patented Jan. 10, 1956

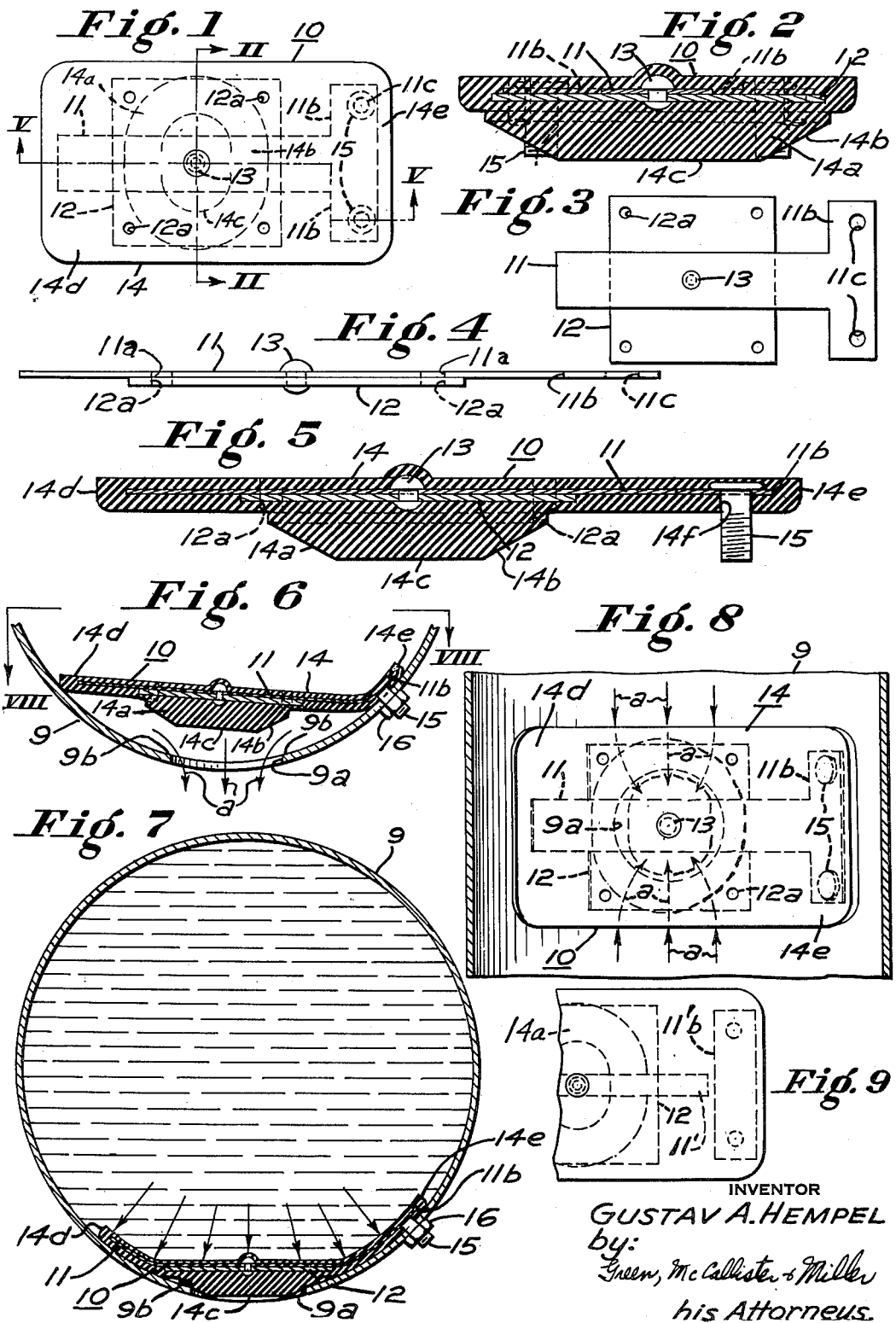

2,730,115

RELIEF VALVE

Gustav A. Hempel, Pittsburgh, Pa., assignor to McDowell Manufacturing Company, a corporation of Pennsylvania Application April 16, 1953, Serial No. 349,219

9 Claims. (Cl. 137—107)

This invention relates to an automatic release valve for use in venting or draining a curvilinear-walled enclosure for liquids, and particularly, to an improved release valve for air venting and liquid drainage of pipe sections such as used in an irrigation system.

In an irrigation system such as employed for spraying crops, it has been customary to employ a plurality of interconnected pipe sections provided with suitable spray heads and supplied with water under pump pressure. The present day trend has been toward so-called portable irrigation systems, wherein the pipe sections may be transported from one location to another in accomplishing a full water coverage of a given area. In this connection, the trend has been toward relatively light wall pipe sections and those which may be easily and quickly disconnected with respect to each other and with respect to a water supply main.

The utilization of systems of the above-mentioned type has given rise to a problem in connection with the need for periodically venting and/or draining the pipe sections. For example, it is advantageous to substantially fully drain the water from each pipe section before it is transported to a new location, both from the standpoint of minimizing the weight involved in manipulating and carrying pipe sections and from the standpoint of avoiding water spillage upon the workers, etc. Further, the air venting of such a system is important when it has been assembled in a given location and water pressure is to be applied to effect an irrigating operation. As to the latter, it has been determined that the pipe sections will not properly fill up if air is entrapped or entrained therein and the operating action will be erratic, in the sense that it spits or flutters and sets up pressure surges.

Previous to my invention, several attempts have been made to provide a valve which would effectively operate to drain water and vent air, but none of them has been fully satisfactory and fool proof in operation. For example, one type employs a rubber flapper tongue which is to be mounted lengthwise of a pipe section end to fit within and close off a hole in a bottom portion thereof after a venting and release action has been accomplished and water pressure is being applied. However, this type is dependent entirely upon the resiliency of its rubber tongue as to its opening action and as a result, when the rubber loses its life or dirt particles are lodged in the pipe, its tongue becomes jammed and thus, totally inoperative. Further, its construction is such that it operates best when the water is applied in one particular direction through the pipe section against the back of its tongue and not against the underside thereof; this thus places a further limitation on its utilization. Other types employing a cork-like action tend to stick and provide a very slow draining or venting action.

It has thus been an object of my invention to provide a new and improved form of release valve which will be of a quick draining and venting type and which will be fool proof in its action;

Another object of my invention has been to devise a more effective and efficient type of release valve and one which is not sensitive to the direction of fluid flow or pressure application in a pipe section within which it is mounted;

A further object of my invention has been to devise an improved release valve which will be positive in its action and which will not depend upon the elastic properties of a rubber-like material for its effective opening action.

These and many other objects of my invention will be apparent to those skilled in the art from this disclosure and description thereof.

In the drawings, Figure 1 is a top plan view of a release valve of my construction of a full size suitable for use in connection with a four inch diameter pipe section;

Figure 2 is a horizontal section in elevation taken along the line II—II of Figure 1 and is double the scale of such figure to more clearly illustrate the construction;

Figure 3 is a top plan view on the scale of Figure 1 showing details of the construction of metal parts of the valve of Figure 1;

Figure 4 is a side view in elevation of the structure of Figure 3 and of twice the scale of such figures;

Figure 5 is a side section in elevation taken along the line V—V of Figure 1 and is double the scale of Figure 1;

Figure 6 is a fragmental section in elevation through a pipe section on the scale of Figures 1 and 3 and showing the release valve of my invention in a mounted relationship therein and in an open or air and water venting position with respect to a bottom opening through the pipe section;

Figure 7 is a full section through the pipe section and on the scale of Figure 6, showing the positive application of fluid pressure therewithin and illustrating a closed position of my valve construction;

Figure 8 is a fragmental horizontal section along the line VIII—VIII of and on the scale of Figure 6; illustrating the open or venting position of the valve; and, Figure 9 is a fragmental top plan view of the scale of Figure 1 showing a modified construction of release or relief valve.

In carrying out my invention, I determined that the factors as to a fool-proof operation had to be met as to a quick and fully effective venting action, as to a fully positive and effective return or opening action, and as to a fully effective closing-off action, all irrespective of whether or not sludge or dirt particles are present. As a result, I have devised a release valve which has a shaped or molded resilient or rubber-like valve body within which is embedded a metal reinforcing member and a leaf-like metal spring member. The body has a convexly-rounded shoulder-like seating face on its underside which is adapted to seat against or upon an inner portion or area of the pipe section within which the valve unit is mounted and that surrounds a venting hole or opening through a bottom opening in its wall.

The release or relief valve unit is adapted to be operatively mounted transversely or crosswise of the pipe section rather than longitudinally thereof, in the sense that it will close and open by a contour-conforming and non-conforming action with respect to an inner wall of the pipe section. The operative movement of the valve unit is primarily dependent upon the flexing action of its metal leaf spring member or element and not upon the elastic action of its rubber-like body. The full sealing-off action, however, is effected by the translation of liquid pressure into a spring flexing action and upon a resilient-flowing and shape-conforming action of the valve body. The contour of the pipe section, in itself, provides a relatively large open passageway when the valve is in an open position to the vent opening through its bottom wall. The construction and positioning of the valve is such that it operates with equal effectiveness whether the liquid pressure is applied from one end or the other end of the pipe section.

Referring to the drawings, I have illustrated my complete valve unit 10 in Figures 1 and 5 and its operation in Figures 6, 7 and 8. As indicated in these figures and also in Figures 3 and 4, the valve has a metal or leaf-like spring element or part 11 which extends longitudinally thereof and which is secured upon a backing-up or relatively rigid, centrally-located, positioning or mounting plate member or part 12 by a rivet 13.

The metal parts 11 and 12 are embedded or molded within a body 14 of a gasket or resilient material (such as rubber or a rubber-like composition) and are located in a proper position therein by extruding or projecting the body material through aligned holes 12a in the mounting plate or substantially square reinforcing portion of part 12 that are located at four corners of the latter, see particularly Figures 1, 4 and 5. This extruding action produces pins connecting upper and lower portions of the enclosing valve body 14, see Figure 5.

As shown particularly in Figures 2 and 5, the body 14 has a centrally located, mound-like or convex shoulder portion 14a on its underside of oval shape, see Figure 1, that defines an upwardly inclining and downwardly declining, continuous side seating face 14b, whose curvature as shown in Figure 8, bounds a circular opening 9a in the bottom wall of the pipe member or section 9 to the inner side of which the valve is to be applied. As shown particularly in Figure 2, the downwardly-converging side of the seating face 14b facilitates the venting action shown in Figures 6 and 8. The seating face 14b terminates in oval shaped, planar bottom face 14c that, as shown in Figure 7, enters but does not project beyond the hole 9a when the valve is in its closed position.

As disclosed particularly in Figure 5, the body 14 is of substantially rectangular shape and has a forward end portion 14d that projects longitudinally and slightly beyond the inset spring element or part 11 and also has a back end portion 14e which projects longitudinally behind a mounting head, tab end or cross portion 11b of the inset spring element or part 11. The end portion 14e has a pair of mounting holes 14f therethrough and flat-headed bolts are adapted to extend through the holes 14f, through aligned holes 11c in the tab end or mounting head portion 11b of the spring part 11, and through aligned holes in the bottom wall of pipe section 9 to secure the valve 10 in position through its flexible metal element or part 11 and provide a fixed pivot line along which it may flex and bend when, as shown in Figure 7, the valve is moved to a closed position. It will be noted that nuts 16 secure the bolts 15 in position and are mounted on the outside of the pipe section 9. The heads of the bolts 15 are shown inset in the resilient body 14 and may be welded or brazed to the part 11. As shown in Figure 3, the part 11 with its portion 11b is of T-shape; and, the part 11 with the part 12 forms a metal inset unit that defines a mounting head portion, a flexible connecting or intermediate portion, and a reinforcing body portion. Also, as shown in Figure 5, the shoulder portion 14a and the seating face 14b of the molded gasket body have an opposed relationship with the body portion, as represented by the part 12.

It will be noted that the pipe section 9 has a circular vent hole or opening 9a through its bottom wall that is smaller than the shoulder 14a and that the shoulder 14a and adjacent portions of the body 14 of the valve will seat upon a relatively wide area 9b about the opening 9a when, as illustrated in Figure 7, positive liquid pressure is applied to the pipe section. It will also appear that the pipe-contour-conforming action of the body 14 of the valve unit 10 is substantially limited to its opposite longitudinal end portions 14e and 14d and that the shoulder 14a is in its natural molded shape when the valve unit has been moved to the closed position of Figure 7. Thus, the closing of the valve unit is dependent essentially upon the flexing of the longitudinal end portions of the metal inset element or part 11 that lie beyond the reinforcing mounting plate member or part 12.

From the above, it will appear that the opening and closing action of the valve 10 is dependent essentially on the force action exerted by or upon the spring element 11 and that the valve is, in effect, flexibly secured and hinged through the agency of the end tab portion 11b. The shape of the shoulder portion 14a of the body 14 and the shape-conforming action of the end portions 14d and 14e will always provide an effective and full liquid seal, regardless of whether sludge or dirt particles are present on the seating face 9b of the pipe section. However, the relatively open fluid flow which is accomplished from opposite sides of the valve unit 10, see the arrows a of Figures 6 and 8, assures an effective washing-out of sludge and dirt particles during the venting action. The mounting plate 12 not only provides rigidity behind the seating shoulder 14a, but along with the spring element 11, fully reinforces it and prevents the resilient body 14 from flowing out of the hole 9a in the pipe section under high liquid pressures.

I prefer to construct the valve 10 so that the tension of its spring element 11 is at least sufficient to fully open it when there is a substantial equalization of atmospheric pressure within the pipe section 9. However, the spring element 11 may be given a greater rigidity or lesser flexibility, so that it will open when the pipe is substantially full of water and no appreciable positive line pressure is being applied to the water. It will be apparent that those skilled in the art may make adjustments in this connection to suit particular requirements of an installation. It will be noted that the elements or parts 11, 12 and 13 and the head portions of the bolts 15 are enclosed by or molded within the body 14 and are thus protected from rusting and from any corrosive action of the liquid being carried by the pipe sections. The tight, resilient seal about the stem of the bolt 15 also protects it from corrosive action of the liquid.

The centrally-positioned reinforcing portion or part 12 of the flexible part 11, in effect, substantially limits the flexing action to its opposite longitudinal end portions. It will be noted that the portion or part 12 is substantially in alignment with or the longitudinal extent of the shaped shoulder 14a since the curvature-conforming action of the valve (see Figure 7) is accomplished at the end portions 14d and 14e of the body 14.

In the embodiment of Figure 9, the tab mounting portion or part 11'b is separate and slightly spaced from the spring element or part 11'. Thus, the part 11' still functions to straighten the valve 10 to the position of Figure 6 when liquid pressure has been relieved in the pipe section 9, but the flexible tension in the rubber between parts 11' and 11'b gives a more sensitive closing action. That is, the valve 10 will seal off easier with a lighter pressure force.

What I claim is:

1. An improved relief valve to be operatively mounted across the curvature of and over a vent hole in a wall portion of a fluid-carrying wall member of curvilinear section which comprises, a valve body of gasket material having a seating shoulder to engage the wall member about the vent hole therein, a flexible part carried by said body and extending therealong, a reinforcing portion backing said flexible part behind said seating shoulder and spaced inwardly from opposite longitudinal ends of said flexible part to define transverse lines of flexure across said flexible part outwardly from opposite longitudinal ends of said reinforcing portion, means securing a longitudinal end portion of said body to the wall member and positioning said body to extend across the curvature of the wall member and over the vent hole therein, and said flexible part normally maintaining said seating shoulder out of closing-off engagement with the wall member and being flexed along the lines of flexure by the application of fluid pressure to move said seating shoulder into closing-off engagement with the wall member.

2. An improved relief valve as defined in claim 1 wherein, said flexible part is inset within said valve body, and said securing means has a portion connected to said flexible part.

3. An improved relief valve as defined in claim 1 wherein, said securing means has a transverse portion carried by said valve body adjacent one end thereof, and said transverse portion has a spaced relationship with respect to an adjacent end portion of said flexible part.

4. An improved relief valve as defined in claim 1 wherein, said seating shoulder is in substantial alignment with said reinforcing portion, said flexible part and said reinforcing portion are enclosed by said body part, and said securing means is inset within said body part and extends from one of the end portions of said flexible part.

5. An improved relief valve to be operatively mounted across the curvature of and over a vent hole in a wall portion of a fluid-carrying wall member of curvilinear section which comprises, a resilient valve body, a flexible metal part inset within said body and extending longitudinally therealong, a reinforcing metal part backing said flexible metal part and positioned centrally thereof to define transverse lines of flexure on said flexible part between its longitudinal ends and longitudinal ends of said reinforcing part, so that said flexible part will shape-conform to the curvature of the wall member upon application of fluid pressure, means securing a longitudinal end portion of said body to the wall member and positioning said body to extend across the curvature of the wall member and over the vent hole therein, a seating shoulder on said body opposed to said reinforcing part and normally maintained out of closing-off engagement with the wall member by said flexible part, said seating shoulder being moved into closing-off engagement with the wall member upon the application of positive fluid pressure to flex said flexible part along the lines of flexure and move said seating shoulder in a substantially non-flexed relationship into seating engagement with the wall member.

6. An improved relief valve to be operatively mounted over a vent hole in a wall portion of a fluid-carrying member which comprises, a metal inset unit having a flexible metal part provided with a mounting head portion connected by a flexible portion to a body portion, a valve body of gasket material molded about said inset unit, said valve body having a seating face opposite the body portion of said inset unit to seat-engage upon the wall portion about the vent hole therein, a centrally disposed metal backing part secured on said body portion to define a substantially non-shape-conforming section substantially co-extensive with said seating face and define shape-conforming sections along said flexible part endwise beyond said backing part, said shape-conforming and non-conforming sections cooperating to define longitudinal lines of flexure therebetween, means for securing the mounting head portion of said unit on the wall portion and for positioning said valve body to extend over the vent hole therein, and said inset unit being constructed to normally maintain said seating face out of seating engagement with the wall portion and to be flexed along the lines of flexure by an application of fluid pressure to said valve body to move its seating face into seating engagement with the wall portion.

7. An improved relief valve to be operatively mounted across the curvature of and over a vent hole in a wall portion of a fluid-carrying wall member of curvilinear section which comprises, a resilient valve body, a flexible metal part inset within said body and extending longitudinally therealong, a backing-up part inset within said body and secured to said flexible part centrally thereof to define transverse lines of flexure across said flexible metal part outwardly beyond opposite end portions of said backing-up part, a curvilinear seating shoulder on an underside of said body and substantially aligned with said backing-up part, and means extending from a longitudinal end portion of said flexible part and through the wall member to secure said valve body within and upon the wall member to extend across its curvature and over the vent hole therein.

8. An improved relief valve to be operatively mounted across the curvature of and over a substantially circular vent hole in a wall portion of a fluid-carrying wall member of curvilinear section which comprises, a substantially rectangular shaped resilient valve body, a flexible metal part inset within said body and extending longitudinally therealong, a substantially square backing-up part inset within said body and secured to said flexible part centrally thereof to reinforce it and define transverse lines of flexure across said flexible metal part beyond opposite longitudinal ends of said backing-up part, a seating shoulder projecting downwardly from an underside of said body in substantial alignment with said backing-up part, a transversely extending tab part inset within said body adjacent one longitudinal end portion of said flexible metal part, and means securing said tab part on an inside of the wall portion to position the longitudinal extent of said valve body in the direction of the curvature of the curvilinear section and over the vent hole.

9. An improved relief valve as defined in claim 8, wherein said seating shoulder is of substantially oval shape and has a downwardly declining continuous side seating face to engage portions of the wall about the vent hole therein.

References Cited in the file of this patent

UNITED STATES PATENTS

| | | |
|---|---|---|
| 1,506,012 | Lewis | Aug. 26, 1924 |
| 1,992,495 | Lynde | Feb. 26, 1935 |
| 2,157,554 | McFarlin | May 9, 1939 |
| 2,561,296 | Stout | July 17, 1951 |
| 2,646,059 | Wittner | July 21, 1953 |

FOREIGN PATENTS

| | | |
|---|---|---|
| 545,646 | Germany | Mar. 4, 1932 |